US012581238B2

(12) United States Patent
Zhang et al.

(10) Patent No.: US 12,581,238 B2
(45) Date of Patent: Mar. 17, 2026

(54) BINDING BAND ASSEMBLY FOR HEADSET AND HEADSET

(71) Applicant: Beijing Zitiao Network Technology Co., Ltd., Beijing (CN)

(72) Inventors: An Zhang, Beijing (CN); Guanghui Liu, Beijing (CN); Yuluo Wen, Beijing (CN); Yi Lai, Beijing (CN); Jianxiong Gong, Beijing (CN); Wei Jia, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 261 days.

(21) Appl. No.: 18/343,228

(22) Filed: Jun. 28, 2023

(65) Prior Publication Data

US 2023/0421957 A1 Dec. 28, 2023

(30) Foreign Application Priority Data

Jun. 28, 2022 (CN) ........................ 202210749802.7

(51) Int. Cl.
*H04R 5/033* (2006.01)

(52) U.S. Cl.
CPC .................................. *H04R 5/0335* (2013.01)

(58) Field of Classification Search
CPC ........................... H04R 5/0335; H04R 1/1066; H04R 2201/10; H04R 1/10
USPC ......................... 381/378, 374, 379, 383, 376
See application file for complete search history.

(56) References Cited

U.S. PATENT DOCUMENTS 7,174,575 B1 * 2/2007 Scherer .................. A42B 3/145
2/418

FOREIGN PATENT DOCUMENTS

WO WO 2021/142575 * 7/2021

* cited by examiner

*Primary Examiner* — Norman Yu

(57) ABSTRACT

Provided are a binding band assembly for a headset and a headset. The binding band assembly includes: a housing in which a rotatable gear is provided; a first binding band and a second binding band each provided with a rack meshed with the gear to drive the first binding band and the second binding band to move towards or away from each other when the gear rotates; a transmission member provided in the housing and fixedly connected to the gear; and a rotation control member provided on the housing and having a toggle portion, a rolling member being provided between the toggle portion and the transmission member, and the toggle portion being configured to drive, by pushing the rolling member to roll, the transmission member to rotate.

20 Claims, 5 Drawing Sheets

BINDING BAND ASSEMBLY FOR HEADSET AND HEADSET

CROSS-REFERENCE TO RELATED APPLICATIONS

This application claims priority to Chinese patent application No. 202210749802.7, filed on Jun. 28, 2022, the entire disclosure of which is incorporated herein by reference.

TECHNICAL FIELD

The present disclosure relates to the technical field of headsets, and more particularly to a binding band assembly for a headset and a headset.

BACKGROUND

In an existing headset, the binding band is adjusted via a gear and rack mechanism to adapt the headset to users of different head sizes. However, since there is a unidirectional or bidirectional ratchet mechanism in the binding band adjustment apparatus, high or low noise may be generated during the adjustment of the binding band, affecting the user's experience.

SUMMARY

The present disclosure aims to solve at least one of the technical problems existing in the related art. To this end, an object of the present disclosure is to provide a binding band assembly for a headset that has low noise during adjustment, is easy to operate, and is advantageous for improving the user's experience.

The present disclosure further provides a headset having the binding band assembly for the headset described above.

A binding band assembly for a headset according to an embodiment of the first aspect of the present disclosure includes: a housing in which a rotatable gear is provided; a first binding band and a second binding band each provided with a rack, the rack being meshed with the gear to drive the first binding band and the second binding band to move towards or away from each other when the gear rotates; a transmission member provided in the housing and fixedly connected to the gear; and a rotation control member provided on the housing and having a toggle portion. A rolling member is provided between the toggle portion and the transmission member, and the toggle portion is configured to drive, by pushing the rolling member to roll, the transmission member to rotate.

According to the binding band assembly for the headset according to the embodiment of the present disclosure, by providing the rolling member between the toggle portion of the rotation control member and the transmission member, when the user rotates the rotation control member, the toggle portion may push the rolling member to move, and the transmission member is driven to rotate by the rolling member, so that the gear is driven to rotate, to finally enable the first binding band and the second binding band to move towards or away from each other, to realize the adjustment to the binding band assembly. During this process, the rolling member itself will also roll, reducing friction between the rolling member and other components, which not only makes the adjustment process smoother, but also reduces noise, improving the user's experience.

According to some embodiments of the present disclosure, a first mounting region and a second mounting region arranged in a first direction are defined between the transmission member and the housing. A dimension, in a radial direction of the transmission member, of one of the first mounting region and the second mounting region increases in the first direction, and a dimension, in the radial direction of the transmission member, of another one of the first mounting region and the second mounting region decreases in the first direction. The rolling member is provided in each of the first mounting region and the second mounting region.

In some embodiments, the first mounting region includes a plurality of first mounting regions, and the second mounting region includes a plurality of second mounting regions. The plurality of first mounting regions and the plurality of second mounting regions are alternately arranged along the first direction.

In some embodiments, the first direction is a clockwise direction or a counterclockwise direction.

In some embodiments, the transmission member includes: a fixing portion fixedly connected to the gear; and a plurality of first projections and a plurality of second projections. The plurality of first projections and the plurality of second projections are provided on a circumferential wall of the fixing portion and alternately arranged along a circumferential direction of the fixing portion. A dimension of each of the plurality of first projections in a radial direction of the fixing portion is greater than a dimension of each of the plurality of second projections in the radial direction of the fixing portion, and the first mounting region and the second mounting region are defined between each of the plurality of second projections, two of the plurality of first projections adjacent to the second projection, and the housing, respectively.

In some examples, the toggle portion is provided between two adjacent first projections of the plurality of first projections and located at an end of a second projection of the plurality of second projections facing away from the fixing portion, and the rolling member is located between each of the two first projections and the toggle portion.

According to a further embodiment of the present disclosure, an elastic member is provided between the rolling member and the transmission member.

In some embodiments, the elastic member is a spring.

In some embodiments, the elastic member is formed as a support arm. One end of the support arm is fixedly connected to the transmission member, another end of the support arm is formed as a free end, and the rolling member abuts against the support arm near the free end of the support arm.

According to a further embodiment of the present disclosure, the rotation control member includes: a toggle member provided in the housing and having the toggle portion; and a knob provided outside the housing and fixedly connected to the toggle member to drive the toggle member to rotate to drive the transmission member to rotate.

In some embodiments, a mounting recess is defined in the housing, and the transmission member, the rolling member, and the toggle member are provided in the mounting recess. The binding band assembly further includes a baffle provided between the transmission member and the gear and configured to close an opening of the mounting recess.

A headset according to an embodiment of the second aspect of the present disclosure includes the binding band assembly for the headset according to the embodiment described above.

Additional aspects and advantages of the present disclosure will be set forth in part in the description which follows and, in part, will be apparent from the description, or may be learned by practice of the present disclosure.

BRIEF DESCRIPTION OF DRAWINGS

The foregoing and/or additional aspects and advantages of the present disclosure will become apparent and readily appreciated from the following description of the embodiments taken in conjunction with the accompanying drawings of which.

Figure 1:
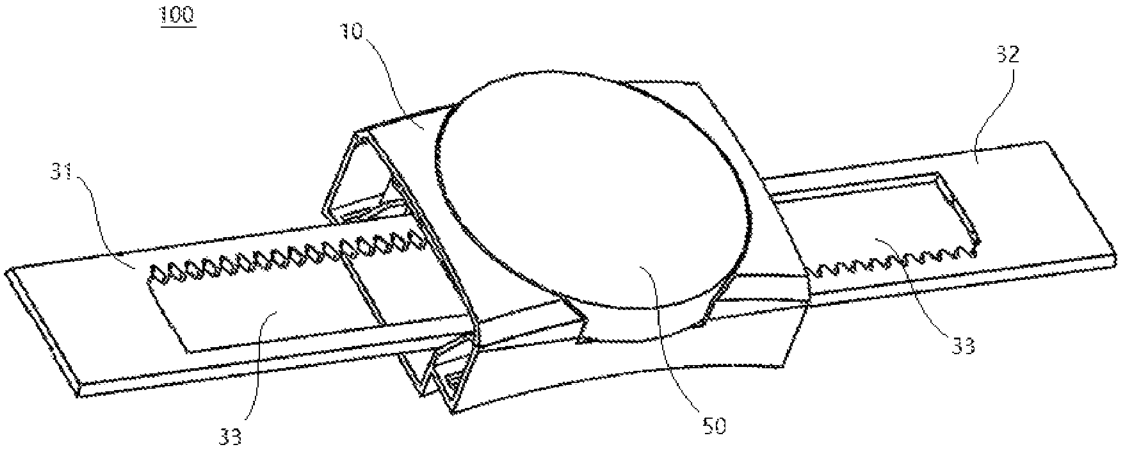
FIG. 1 is a structural diagram of a binding band assembly for a headset according to one embodiment of the present disclosure.

REFERENCE NUMERALS binding band assembly 100, housing 10, first housing 11, first mounting region 111, second mounting region 112, mounting recess 113, second housing 12, gear 20, second fixing hole 21, first binding band 31, second binding band 32, rack 33, transmission member 40, fixing portion 41, second fixing shaft 411, first projection 421, second projection 422, rotation control member 50, toggle member 51, toggle portion 511, first fixing hole 512, knob 52, first fixing shaft 521, rolling member 60, spring 71, support arm 72, baffle 80, via 81, circuit board 90.

DESCRIPTION OF EMBODIMENTS

Embodiments of the present disclosure will be described below, and examples of the embodiments are illustrated in the accompanying drawings, throughout which the same or similar reference numbers denote the same or similar elements or elements having the same or similar function. The embodiments described below with reference to the figures are exemplary, are merely illustrative of the present disclosure, and should not be construed as limiting the present disclosure.

A binding band assembly 100 for a headset according to the embodiments of the present disclosure is described below with reference to FIGS. 1 to 8.

Figure 2:
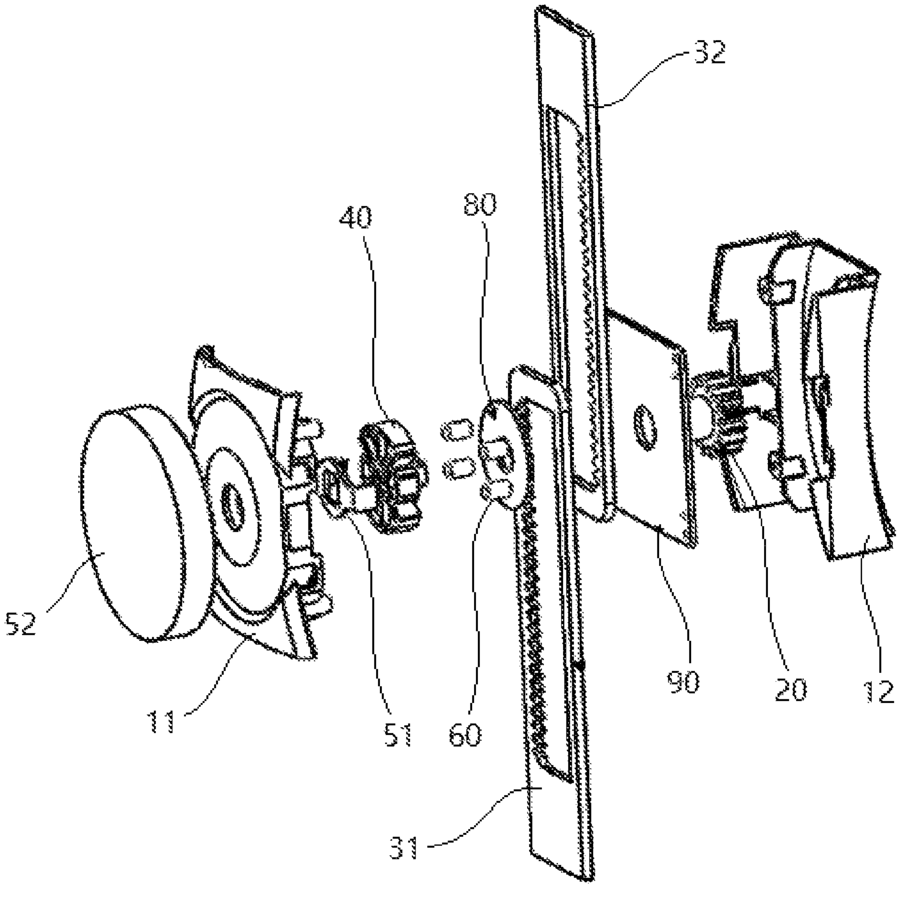
FIG. 2 is a structural exploded view of a binding band assembly for a headset according to one embodiment of the present disclosure.

As shown in FIG. 1 and FIG. 2, a binding band assembly 100 for a headset according to an embodiment of the present disclosure includes a housing 10, a first binding band 31, and a second binding band 32. A rotatable gear 20 is provided in the housing 10. The first binding band 31 and the second binding band 32 are each provided with a rack 33, and the rack 33 of the first binding band 31 and the rack 33 of the second binding band 32 are each meshed with the gear 20 to drive the first binding band 31 and the second binding band 32 to move towards or away from each other when the gear 20 rotates.

That is to say, by providing the gear 20 and the first binding band 31 and the second binding band 32 having the rack 33, the first binding band 31 and the second binding band 32 can be driven to move towards each other, i.e., to achieve tension adjustment to the binding band assembly 100, and the first binding band 31 and the second binding band 32 can alternatively be driven to move away from each other, i.e., to achieve release adjustment to the binding band assembly 100.

Further, the binding band assembly 100 further includes a transmission member 40 and a rotation control member 50. The transmission member 40 is provided in the housing 10 and fixedly connected to the gear 20. The rotation control member 50 is provided on the housing 10 and has a toggle portion 511. A rolling member 60 is provided between the toggle portion 511 and the transmission member 40, and the toggle portion 511 may drive the transmission member 40 to rotate by pushing the rolling member 60 to roll. The rolling member 60 may be a roller, a ball or the like.

According to the binding band assembly 100 for the headset according to the embodiment of the present disclosure, by providing the rolling member 60 between the toggle portion 511 of the rotation control member 50 and the transmission member 40, when the user rotates the rotation control member 50, the toggle portion 511 can push the rolling member 60 to move, and the transmission member 40 is driven to rotate by the rolling member 60, so that the gear 20 is driven to rotate, to finally enable the first binding band 31 and the second binding band 32 to move towards or away from each other, to realize the adjustment to the binding band assembly 100. During this process, the rolling member 60 itself will also roll, which reduces friction between the rolling member 60 and other components, not only making the adjustment process smoother, but also reducing noise, and improving the user's experience.

Figure 5:
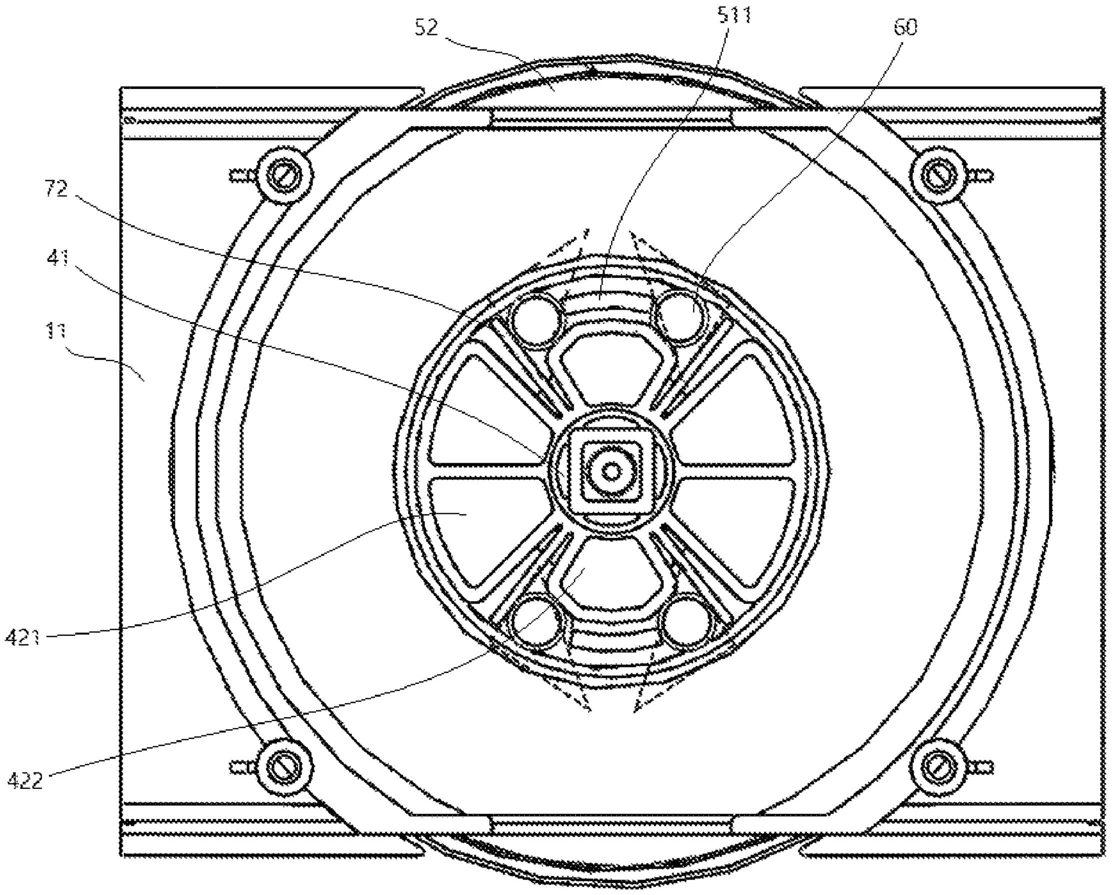
FIG. 5 is an enlarged partial structural view of the binding band assembly shown in FIG. 2.
Figure 6:
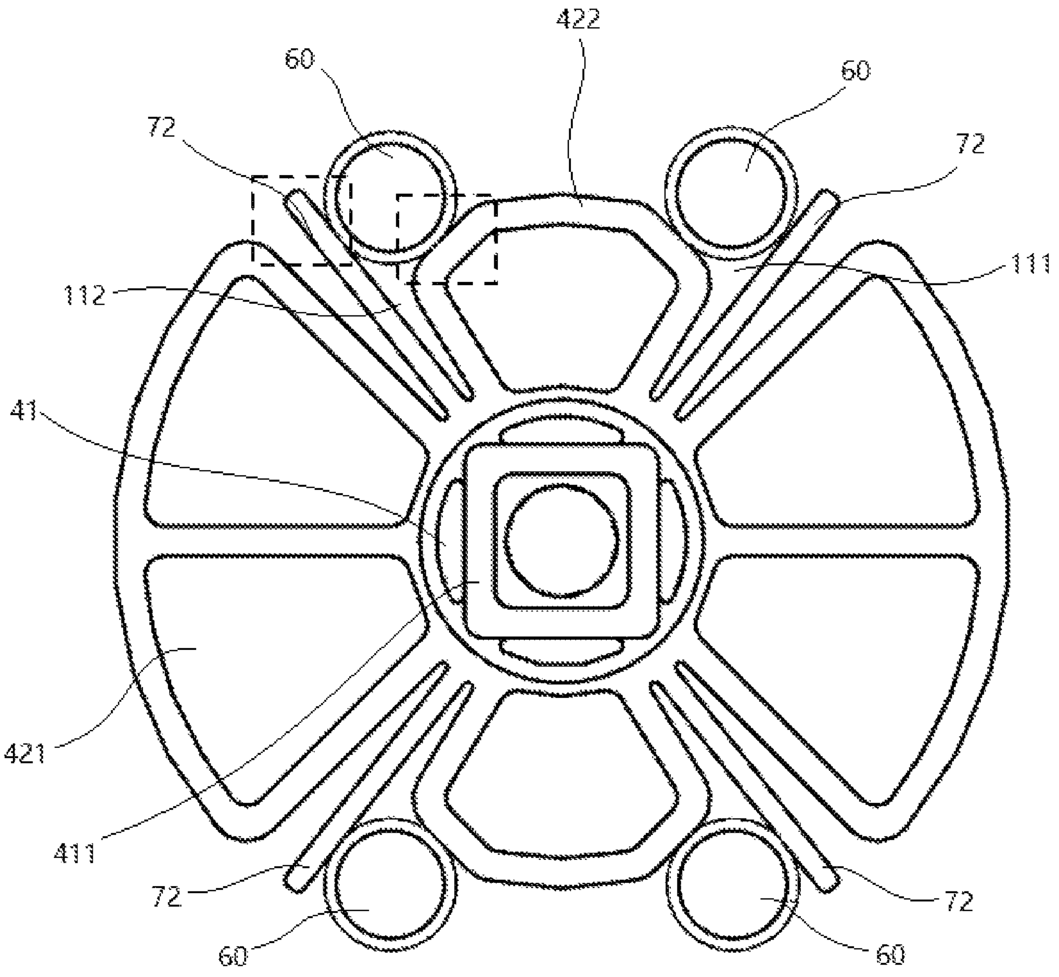
FIG. 6 is a structural diagram of a transmission member and a rolling member of the binding band assembly shown in FIG. 2.
Figure 8:
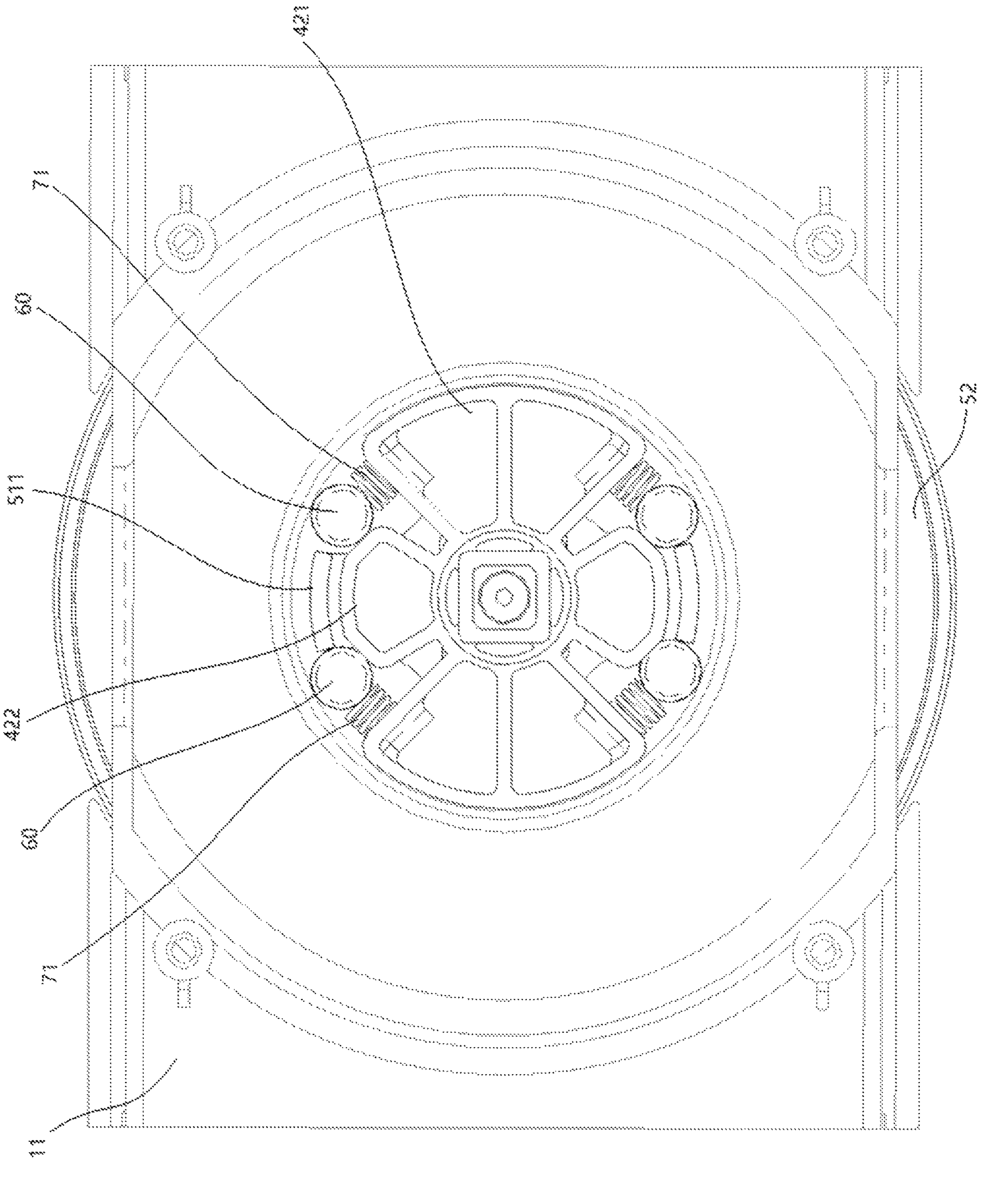
FIG. 8 is an enlarged partial structural view of a binding band assembly for a headset according to another embodiment of the present disclosure.

As shown in FIGS. 5 to 6 and 8, according to some embodiments of the present disclosure, a first mounting region 111 and a second mounting region 112 arranged in a first direction are defined between the transmission member 40 and the housing 10. A dimension, in a radial direction of the transmission member 40, of one of the first mounting region 111 and the second mounting region 112 increases in the first direction, and a dimension, in the radial direction of the transmission member 40, of another one of the first mounting region 111 and the second mounting region 112 decreases in the first direction. The rolling member 60 is provided in each of the first mounting region 111 and the second mounting region 112.

For example, the first direction is a clockwise direction of the transmission member 40, the dimension, in the radial direction of the transmission member 40, of the first mounting region 111 increases in the clockwise direction, and the dimension, in the radial direction of the transmission member 40, of the second mounting region 112 decreases in the clockwise direction. As another example, the dimension, in the radial direction of the transmission member 40, of the second mounting region 112 increases in the first direction, and the dimension, in the radial direction of the transmission member 40, of the first mounting region 111 decreases in the first direction.

Specifically, as shown in FIGS. 5 to 6 and 8, the first mounting region 111 and the second mounting region 112 each may be formed as a wedge-shaped region in which the rolling member 60 is provided.

When the rotation control member 50 rotates clockwise, a side, in the clockwise direction, of the toggle portion 511 pushes the rolling member 60 in the first mounting region 111 to move clockwise, i.e., the rolling member 60 moves to a side in the wedge-shaped region with a larger space. At this time, the rolling member 60 in the first mounting region 111 pushes the entire transmission member 40 to rotate clockwise, correspondingly pushing the rolling member 60 in the second mounting region 112 to rotate clockwise, in such a manner that the clockwise rotation of the rotation control member 50 is transmitted to the clockwise rotation of the transmission member 40, and finally the adjustment to the binding band assembly 100 is achieved.

It should be noted that when the rotation control member 50 rotates counterclockwise, the operation thereof is similar and will not be described again. The bidirectional adjustment function of the rotation control member 50 is therefore achieved.

When the first binding band 31 or the second binding band 32 is manually pulled to drive the transmission member 40 to rotate clockwise, the rolling member 60 in the first mounting region 111 moves towards a side in the corresponding wedge-shaped region with a smaller space relative to the transmission member 40, and at this time, the rolling member 60 prevents the rotation of the transmission member 40, thereby achieving a clockwise self-locking function. The counterclockwise self-locking function is similar and will not be described again. Thus, the bidirectional self-locking function of the knob is achieved.

As shown in FIGS. 5 to 6 and 8, in some embodiments, a plurality of first mounting regions 111 and a plurality of second mounting regions 112 are included. The plurality of first mounting regions 111 and the plurality of second mounting regions 112 are alternately arranged along the first direction.

That is to say, when the rotation control member 50 rotates clockwise, the toggle portion 511 can push the rolling members 60 in the plurality of first mounting regions 111 to move clockwise, and the rolling members 60 together push the entire transmission member 40 to rotate clockwise, accordingly pushing the rolling members 60 in the plurality of second mounting regions 112 to rotate clockwise, so that the clockwise rotation of the rotation control member 50 is transmitted to the clockwise rotation of the transmission member 40, and finally the adjustment to the tightness of the binding band assembly 100 is achieved.

Thus, the above setting is advantageous in reducing the force borne by the single rolling member 60, improving the reliability of usage of the binding band assembly 100, making the adjustment process smoother, further reducing noise, and improving the user's experience.

In some embodiments, the first direction is a clockwise direction or a counterclockwise direction.

As shown in FIGS. 5 to 8, in some embodiments, the transmission member 40 includes a fixing portion 41 fixedly connected to the gear 20, a plurality of first projections 421, and a plurality of second projections 422. The plurality of first projections 421 and the plurality of second projections 422 are provided on a circumferential wall of the fixing portion 41 and alternately arranged along a circumferential direction of the fixing portion 41. That is to say, one second projection 422 is provided between two adjacent first projections 421, and one first projection 421 is provided between two adjacent second projections 422.

A dimension of the first projection 421 in a radial direction of the fixing portion 41 is greater than a dimension of the second projection 422 in the radial direction of the fixing portion 41, and the first mounting region 111 and the second mounting region 112 are defined between the second projection 422 and two first projections 421 adjacent to the second projection 422 and the housing 10, respectively. By setting the first projections 421 and the second projections 422 in this manner, the wedge-shaped region may be defined between the first projection 421, the second projection 422, and the housing 10, facilitating to achieve the adjustment to the tightness of the binding band assembly 100.

As shown in FIG. 6, the first projection 421 and the second projection 422 may each be formed as a sector-shaped projection, a wedge-shaped region is defined between a side of each of the first projection 421 and the second projection 422 facing another one of the first projection 421 and the second projection 422 and the housing 10, and the rolling member 60 may be engaged with the first projection 421 and the second projection 422 in a rollable manner, reducing friction between the rolling member 60 and the first projection 421 and between the rolling member 60 and the second projection 422, reducing operating noise.

As shown in FIGS. 5 and 8, in some examples, the toggle portion 511 is provided between two adjacent first projections 421 and located at one end of the second projection 422 facing away from the fixing portion 41, and the rolling member 60 is located between the first projection 421 and the toggle portion 511.

Thus, by setting that the dimension of the first projection 421 in the radial direction of the fixing portion 41 is greater than the dimension of the second projection 422 in the radial direction of the fixing portion 41, a mounting space for the toggle portion 511 can be reserved between the housing 10 and one end of the second projection 422 facing away from the fixing portion 41, thereby facilitating the toggle portion 511 to push the rolling member 60 to move.

As shown in FIGS. 5 to 6 and 8, according to a further embodiment of the present disclosure, an elastic member is provided between the rolling member 60 and the transmission member 40. By providing the elastic member between the rolling member 60 and the transmission member 40, the bidirectional noise-free adjustment and self-locking function of the binding band assembly 100 can be achieved.

When the rotation control member 50 rotates clockwise, a side of the toggle portion 511 in a clockwise direction pushes the rolling member 60 in the first mounting region 111 to move clockwise, and the rolling member 60 in the first mounting region 111 pushes away the elastic member in front of the rolling member 60 clockwise, and thus moves to a side in the wedge-shaped region with a larger space. At this time, the rolling member 60 in the first mounting region 111 pushes the entire transmission member 40 clockwise, and the elastic member on the transmission member 40 accordingly pushes the rolling member 60 in the second mounting region 112 to rotate clockwise, so that the clockwise rotation of the rotation control member 50 is transmitted to the clockwise rotation of the transmission member 40, and finally the adjustment to the binding band assembly 100 is achieved.

Figure 7:
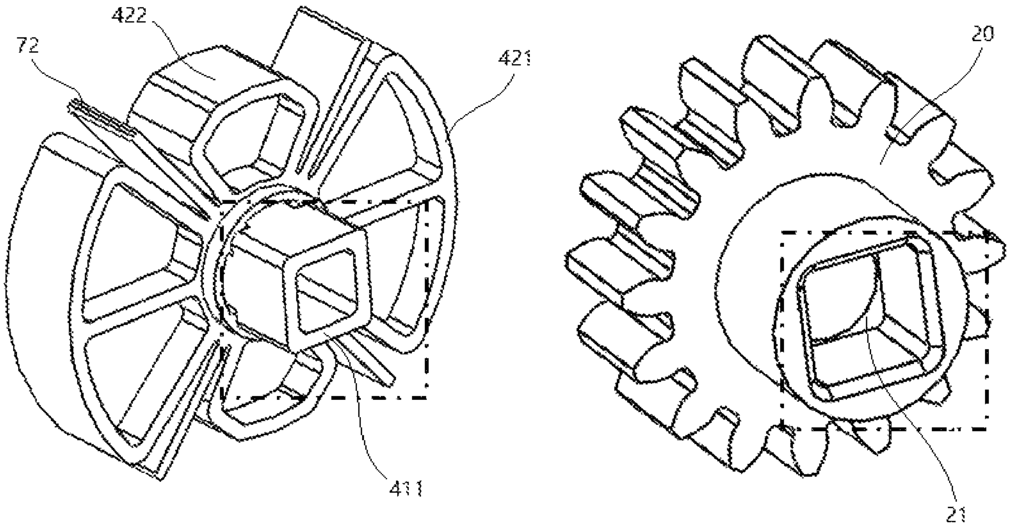
FIG. 7 is a structural diagram of a transmission member and a gear of the binding band assembly shown in FIG. 2.

As shown in FIGS. 5 to 7, in some embodiments, the elastic member is formed as a support arm 72. One end of the support arm 72 is fixedly connected to the transmission member 40 and the other end is formed a free end. The rolling member 60 abuts against the support arm 72 near the free end of the support arm 72.

When the rotation control member 50 rotates clockwise, the toggle portion 511 can push the rolling member 60 in the first mounting region 111 to move clockwise, and the rolling member 60 in the first mounting region 111 pushes away the support arm 72 in front of the rolling member 60 clockwise to deform the support arm 72, and thus the rolling member 60 moves to a side in the wedge-shaped region with a larger space, the entire operation process of which is noise-free, and is a continuously variable transmission, which is more suitable for the binding band adjustment for the headset.

As shown in FIG. 8, in some embodiments, the elastic member is a spring 71. When the rotation control member 50 rotates clockwise, the toggle portion 511 can push the rolling member 60 in the first mounting region 111 to move clockwise, and the rolling member 60 in the first mounting region 111 pushes the spring 71 in front of the rolling member 60 clockwise to compress the spring 71, and thus the rolling member 60 moves to a side in the wedge-shaped region with a larger space, the entire operation process of which is noise-free, and is a continuously variable transmission, which is more suitable for the binding band adjustment for the headset.

Figure 3:
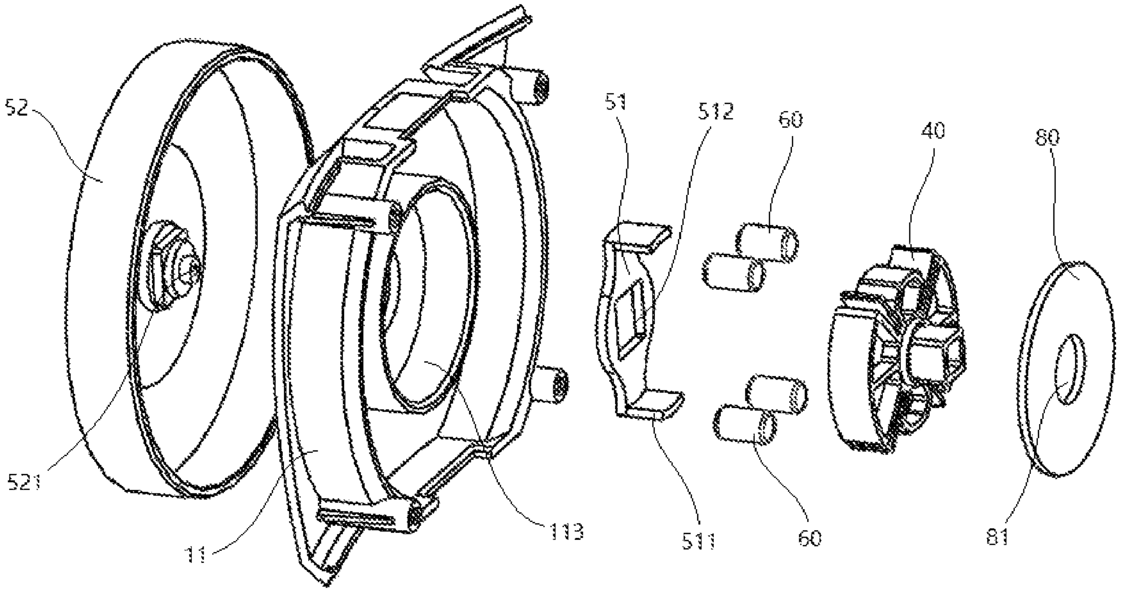
FIG. 3 is a partial structural diagram of the binding band assembly shown in FIG. 2.
Figure 4:
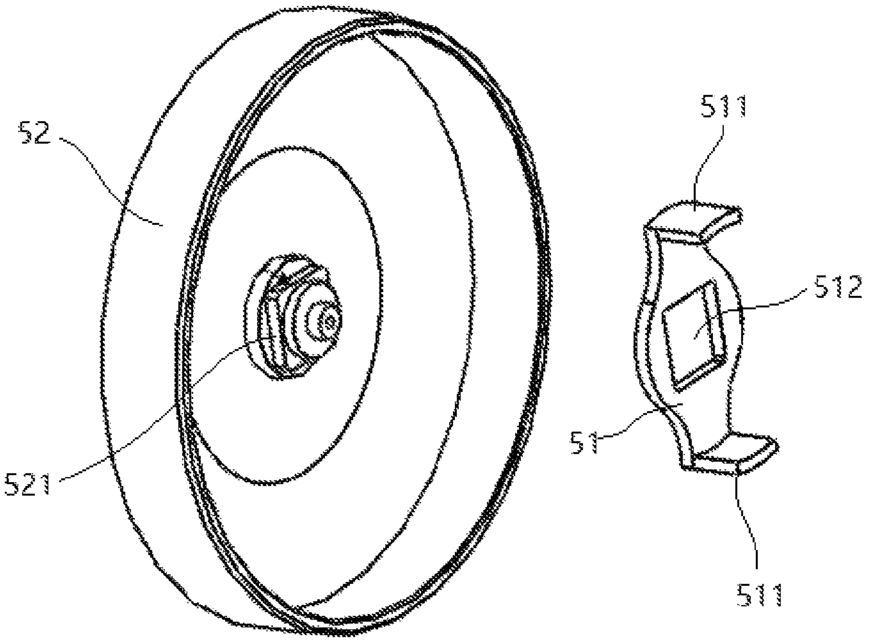
FIG. 4 is a structural diagram of a rotation control member of the binding band assembly shown in FIG. 2.

As shown in FIGS. 3 and 4, according to a further embodiment of the present disclosure, the rotation control member 50 includes a toggle member 51 and a knob 52. The toggle member 51 is provided in the housing 10 and has a toggle portion 511. The knob 52 is provided outside the housing 10 and fixedly connected to the toggle member 51. When the knob 52 rotates, the rotating knob 52 can drive the toggle member 51 to rotate, and the transmission member 40 is driven to rotate by the toggle portion 511 of the toggle member 51, to finally enable the first binding band 31 and the second binding band 32 to move towards or away from each other, achieving the adjustment to the binding band assembly 100.

The knob 52 has a first fixing shaft 521 on a side thereof facing the housing 10, the toggle member 51 has a first fixing hole 512, and the first fixing shaft 521 extends into the housing 10 and is inserted in the first fixing hole 512 to achieve the connection between the knob 52 and the toggle member 51.

In order to prevent relative rotation between the knob 52 and the toggle member 51 and ensure that the two may rotate in a forward direction or in a reverse direction simultaneously, the first fixing hole 512 may be provided as a non-circular hole, and correspondingly, a cross-sectional shape of the first fixing shaft 521 is the same as that of the first fixing hole 512. For example, the first fixing hole 512 may be formed as a D-shaped hole or a square hole, and correspondingly, the first fixing shaft 521 may be formed as a D-shaped shaft or a square shaft.

As shown in FIG. 7, the transmission member 40 has a second fixing shaft 411 on a side thereof facing the gear 20, the gear 20 has a second fixing hole 21, and the second fixing shaft 411 is inserted in the second fixing hole 21 to achieve the connection between the transmission member 40 and the gear 20.

In order to prevent relative rotation between the transmission member 40 and the gear 20 and ensure that the two may rotate in a forward direction or in a reverse direction synchronously, the second fixing hole 21 may be provided as a non-circular hole, and correspondingly, the cross-sectional shape of the second fixing shaft 411 is the same as that of the second fixing hole 21. For example, the second fixing hole 21 may be formed as a D-shaped hole or a square hole, and correspondingly, the second fixing shaft 411 may be formed as a D-shaped shaft or a square shaft.

As shown in FIG. 4, in some embodiments, a mounting recess 113 is defined in the housing 10, and the transmission member 40, the rolling member 60, and the toggle member 51 are provided in the mounting recess 113. The binding band assembly 100 further includes a baffle 80 provided between the transmission member 40 and the gear 20 and configured to close an opening of the mounting recess 113. The baffle 80 has a via 81. The second fixing shaft 411 on the transmission member 40 passes through the via 81 to be inserted in the gear 20, which is simple in structure and convenient for assembling and disassembling.

In some embodiments, a circuit board 90 is further provided in the housing 10, and the circuit board 90 is provided between the transmission member 40 and the gear 20. The second fixing shaft 411 on the transmission member 40 passes through the circuit board 90 to be inserted in the gear 20, which is simple in structure and convenient for assembling and disassembling.

In some embodiments, the housing 10 includes a first housing 11 and a second housing 12. The first housing 11 and the second housing 12 may be in snap fit or connected by a plurality of fasteners. The first housing 11 has a mounting recess 113 on a side thereof facing the second housing 12, an opening of the mounting recess 113 faces the second housing 12, the knob 52 is provided on a side of the first housing 11 facing away from the second housing 12, and the transmission member 40 and the toggle member 51 are provided in the mounting recess 113, which are compact in structure and convenient in connection.

The binding band assembly 100 for the headset according to the embodiments of the present disclosure is simple in structure and convenient for assembling and disassembling. Since the binding band assembly 100 has no ratchet teeth, etc., is self-locked by means of the transmission member 40, and is provided with the rolling member 60, the entire operation process is noise-free, and is a continuously variable transmission, with high adjustment accuracy, which is more suitable for the binding band adjustment for the headset, improving the wearing comfort of the binding band assembly 100.

A headset according to an embodiment of the present disclosure includes the binding band assembly 100 for the headset according to the embodiment described above.

Since the binding band assembly 100 for the headset according to the embodiment of the present disclosure has the above-described technical effects, the headset according to the embodiment of the present disclosure also has the above-described technical effects. That is, by using the above-described binding band assembly 100, the adjustment process of the binding band assembly 100 is smoother, reducing noise, and improving the user's experience.

In the description of the present disclosure, it is to be understood that orientations or positional relationships specified by the terms "central", "longitudinal", "transverse", "length", "width", "thickness", "upper", "lower", "front", "back", "vertical", "horizontal", "top", "bottom", "inner", "outer", "axial", "radial", "circumferential", and the like are based on the orientation or positional relationships shown in the drawings, are merely for convenience in describing the present disclosure and simplifying the description, and do not indicate or imply that the apparatus or element referred to must have a particular orientation, or be constructed and operated in a particular orientation. Therefore, the present disclosure should not be construed as being limited thereto.

Other configurations and operations of the headset according to embodiments of the present disclosure are known to those of ordinary skill in the art and will not be described in detail herein.

In the description of this specification, descriptions with references to the terms "one embodiment", "some embodiments", "exemplary embodiments", "examples", "specific examples", or "some examples", etc. mean that a particular feature, structure, material, or characteristic described in connection with the embodiment or example is included in at least one embodiment or example of the present disclosure. In this specification, schematic representations of the above terms do not necessarily refer to the same embodiment or example. Furthermore, the particular features, structures, materials, or characteristics described may be combined in any suitable manner in any one or more embodiments or examples.

While embodiments of the present disclosure have been shown and described, it will be appreciated by those skilled in the art that various changes, modifications, substitutions, and alterations may be made to these embodiments without departing from the principles and ideas of the present disclosure, and the scope of the present disclosure is defined by the claims and their equivalents.

What is claimed is:

1. A binding band assembly for a headset, the binding band assembly comprising:

a housing in which a rotatable gear is provided;

a first binding band and a second binding band, wherein the first binding band is provided with a first rack and the second binding band is provided with a second rack, wherein the first rack and the second rack are meshed with the gear to respectively drive the first binding band and the second binding band to move towards or away from each other when the gear rotates;

a transmission member provided in the housing and fixedly connected to the gear; and a rotation control member provided on the housing and having a toggle portion, wherein a rolling member is provided between the toggle portion and the transmission member, and the toggle portion is configured to drive, by pushing the rolling member to roll, the transmission member to rotate, and the rotation of the transmission member drives the gear to rotate.

2. The binding band assembly for the headset according to claim 1, wherein a first mounting region and a second mounting region arranged in a first direction are defined between the transmission member and the housing, a dimension, in a radial direction of the transmission member, of one of the first mounting region and the second mounting region increases in the first direction, and a dimension, in the radial direction of the transmission member, of another one of the first mounting region and the second mounting region decreases in the first direction, and the rolling member is provided in each of the first mounting region and the second mounting region.

3. The binding band assembly for the headset according to claim 2, wherein the first mounting region comprises a plurality of first mounting regions, and the second mounting region comprises a plurality of second mounting regions, the plurality of first mounting regions and the plurality of second mounting regions being alternately arranged along the first direction.

4. The binding band assembly for the headset according to claim 2, wherein the first direction is a clockwise direction or a counterclockwise direction.

5. The binding band assembly for the headset according to claim 2, wherein the transmission member comprises:

a fixing portion fixedly connected to the gear; and a plurality of first projections and a plurality of second projections, the plurality of first projections and the plurality of second projections being provided on a circumferential wall of the fixing portion and alternately arranged along a circumferential direction of the fixing portion, wherein a dimension of each of the plurality of first projections in a radial direction of the fixing portion is greater than a dimension of each of the plurality of second projections in the radial direction of the fixing portion, and the first mounting region and the second mounting region are defined between each of the plurality of second projections, two of the plurality of first projections adjacent to the second projection, and the housing, respectively.

6. The binding band assembly for the headset according to claim 5, wherein the toggle portion is provided between two adjacent first projections of the plurality of first projections and located at an end of a second projection of the plurality of second projections facing away from the fixing portion, and the rolling member is located between each of the two first projections and the toggle portion.

7. The binding band assembly for the headset according to claim 1, wherein an elastic member is provided between the rolling member and the transmission member.

8. The binding band assembly for the headset according to claim 7, wherein the elastic member is a spring.

9. The binding band assembly for the headset according to claim 7, wherein the elastic member is formed as a support arm, one end of the support arm being fixedly connected to the transmission member, another end of the support arm being formed as a free end, and the rolling member abutting against the support arm near the free end of the support arm.

10. The binding band assembly for the headset according to claim 1, wherein the rotation control member comprises:

a toggle member provided in the housing and having the toggle portion; and a knob provided outside the housing and fixedly connected to the toggle member to drive the toggle member to rotate to drive the transmission member to rotate.

11. The binding band assembly for the headset according to claim 10, wherein a mounting recess is defined in the housing, the transmission member, the rolling member, and the toggle member being provided in the mounting recess; and the binding band assembly further comprises a baffle provided between the transmission member and the gear and configured to close an opening of the mounting recess.

12. A headset, comprising a binding band assembly for the headset, the binding band assembly comprising:

a housing in which a rotatable gear is provided;

a first binding band and a second binding band, wherein the first binding band is provided with a first rack and the second binding band is provided with a second rack, wherein the first rack and the second rack are meshed with the gear to respectively drive the first binding band and the second binding band to move towards or away from each other when the gear rotates;

a transmission member provided in the housing and fixedly connected to the gear; and a rotation control member provided on the housing and having a toggle portion, wherein a rolling member is provided between the toggle portion and the transmission member, and the toggle portion is configured to drive, by pushing the rolling member to roll, the transmission member to rotate, and the rotation of the transmission member drives the gear to rotate.

13. The headset according to claim 12, wherein a first mounting region and a second mounting region arranged in a first direction are defined between the transmission member and the housing, a dimension, in a radial direction of the transmission member, of one of the first mounting region and the second mounting region increases in the first direction, and a dimension, in the radial direction of the transmission member, of another one of the first mounting region and the second mounting region decreases in the first direction, and the rolling member is provided in each of the first mounting region and the second mounting region.

14. The headset according to claim 13, wherein the first mounting region comprises a plurality of first mounting regions, and the second mounting region comprises a plurality of second mounting regions, the plurality of first mounting regions and the plurality of second mounting regions being alternately arranged along the first direction.

15. The headset according to claim 13, wherein the first direction is a clockwise direction or a counterclockwise direction.

16. The headset according to claim 13, wherein the transmission member comprises:

a fixing portion fixedly connected to the gear; and a plurality of first projections and a plurality of second projections, the plurality of first projections and the plurality of second projections being provided on a circumferential wall of the fixing portion and alternately arranged along a circumferential direction of the fixing portion, wherein a dimension of each of the plurality of first projections in a radial direction of the fixing portion is greater than a dimension of each of the plurality of second projections in the radial direction of the fixing portion, and the first mounting region and the second mounting region are defined between each of the plurality of second projections, two of the plurality of first projections adjacent to the second projection, and the housing, respectively.

17. The headset according to claim 16, wherein the toggle portion is provided between two adjacent first projections of the plurality of first projections and located at an end of a second projection of the plurality of second projections facing away from the fixing portion, and the rolling member is located between each of the two first projections and the toggle portion.

18. The headset according to claim 12, wherein an elastic member is provided between the rolling member and the transmission member.

19. The headset according to claim 18, wherein the elastic member is a spring.

20. The headset according to claim 18, wherein the elastic member is formed as a support arm, one end of the support arm being fixedly connected to the transmission member, another end of the support arm being formed as a free end, and the rolling member abutting against the support arm near the free end of the support arm.

* * * * *